United States Patent [19]
Detable et al.

[11] Patent Number: 5,459,906
[45] Date of Patent: Oct. 24, 1995

[54] BAND CLAMP FITTING

[75] Inventors: Pascal Detable, Gievres; Michel Andre, Romorantin Lanthenay, both of France

[73] Assignee: Etablissements CAILLAU, Issy-les-Moulineaux, France

[21] Appl. No.: 277,195

[22] Filed: Jul. 19, 1994

[30] Foreign Application Priority Data

Jul. 30, 1993 [FR] France .................................. 93 09407

[51] Int. Cl.⁶ .................................................. B65D 63/00
[52] U.S. Cl. .................. 24/20 R; 24/20 CW; 24/20 EE; 24/20 TT
[58] Field of Search .............................. 24/20 R, 20 CW, 24/20 EE, 20 TT

[56] References Cited

U.S. PATENT DOCUMENTS

| | | | |
|---|---|---|---|
| 4,890,360 | 1/1990 | Calmettes et al. | 24/20 R |
| 4,907,319 | 3/1990 | Calmettes et al. | 24/20 R |
| 4,924,558 | 5/1990 | Calmettes et al. | 24/20 R |
| 4,996,749 | 3/1991 | Takahashi | 24/20 R |

FOREIGN PATENT DOCUMENTS

| | | |
|---|---|---|
| 0079252 | 5/1983 | European Pat. Off. . |
| 0236217 | 9/1987 | European Pat. Off. . |

*Primary Examiner*—Victor N. Sakran
*Attorney, Agent, or Firm*—Marshall & Melhorn

[57] ABSTRACT

This invention relates to a band clamp fitting constituted by a metal band wound on itself, presenting, near one of its ends, an ear provided with an extension and, at the other end, a hook. The extension presents a projecting part, of transverse dimension less than that of the free edge of the hook and capable of cooperating with pre-hooking means when the clamp fitting is in non-tightened state. The free edge of the hook presents a notch, of dimensions adapted to those of the projecting part and offset with respect to the latter in the transverse sense of the band. A portion of the free edge of the hook is located in line with the projecting part and is capable of being hooked therebehind.

6 Claims, 3 Drawing Sheets

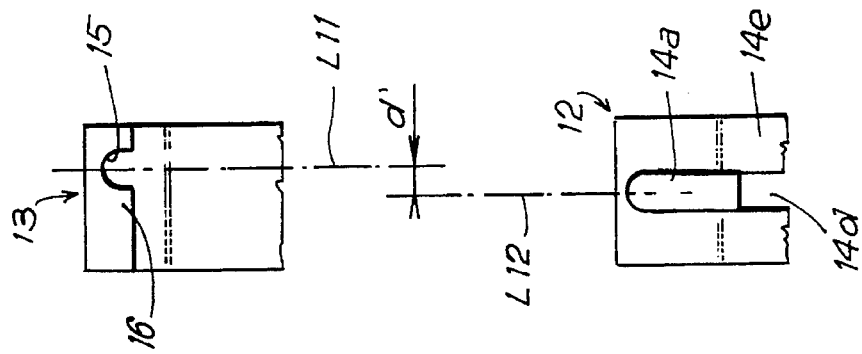
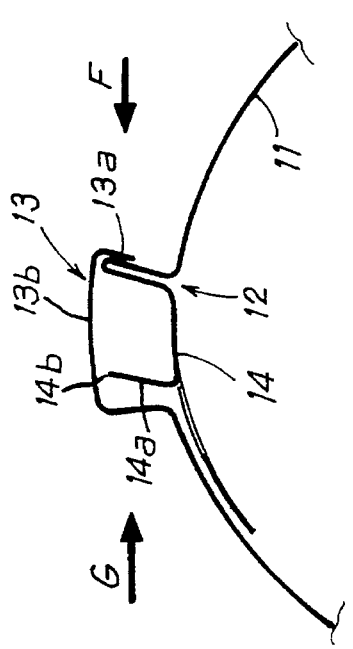
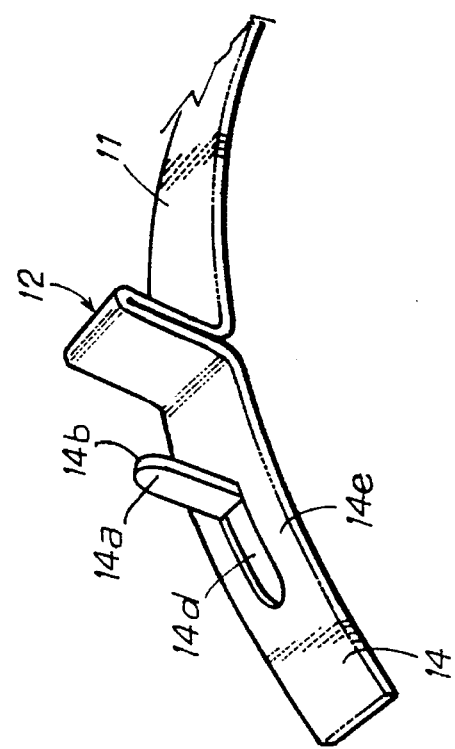

BAND CLAMP FITTING

FIELD OF THE INVENTION

The present invention relates to a band clamp fitting constituted by a metal band wound on itself, presenting near one of its ends a double radial fold, referred to as "ear", projecting outwardly of the clamp and equipped with an extension extending substantially along the periphery of the clamp.

The other end of the band is provided with a hook capable of being hooked behind the ear after the clamp fitting has been tightened.

The extension presents a projecting part whose transverse dimension is less than that of the free edge of the hook. This part projects radially outwardly of the clamp fitting and is capable of cooperating with pre-hooking means when the clamp fitting is in the nontightened state.

BACKGROUND OF THE INVENTION

Such a clamp fitting is known in particular by European Patent EP 0 079 252. One advantage of this clamp fitting resides in the fact that, thanks to the pre-hooking means, it presents a pre-tightening diameter close to that of the object to be tightened, while being slightly larger. Positioning of this clamp fitting, then tightening thereof, are thereby facilitated.

In certain applications, the operator may need, from the pre-hooking position, to open the clamp to pass it around the object to be tightened. Such an operation is relatively delicate with known clamp fittings.

Moreover, for certain particularly demanding applications, it is important to guarantee the hold of the clamp fitting in all circumstances.

Although the clamp fitting of the above-mentioned type is of both rapid and reliable use, the hold of the mechanical assemblies or, if need be, the tightness of a supple hose pipe fitted on a rigid tube, must thus remain sufficient even if the clamp fitting is poorly hooked.

It is an object of the present invention to improve the known clamp fittings of the type mentioned above in order to facilitate passage from the pre-hooking position to the open position, but without allowing such passage from one position to the other being effected in untimely manner.

At the same time, the invention aims at providing these known clamp fittings with a safety device, with a view to avoiding the unfortunate consequences of a poor hooking.

SUMMARY OF THE INVENTION

To that end, according to the invention, the free edge of the hook presents a notch whose transverse dimension and radial height are adapted to those of the projecting part. The notch and the projecting part are offset with respect to each other in the tranverse sense of the band, while the projecting part is remote from the ear, in the peripheral sense, by a distance at least equal to the thickness of the free edge of the hook. The pre-hooking means comprise a portion of the free edge of the hook, referred to as "pre-hooking portion", capable of being hooked behind the projecting part, close to the notch and located in line with said projecting part.

The transverse dimension of the notch is at least equal to that of the projecting part, while its radial height is substantially equal to that of said projecting part.

In this way, the projecting part may easily be engaged beneath the hook or, in an opposite movement, be disengaged therefrom, without it being necessary, on this occasion, to exert a pressure on that end of the clamp fitting provided with the projecting part in an attempt to return the latter radially towards the inside of the clamp fitting.

Passage from one to the other of the open and pre-hooking positions of the clamp fitting is thus facilitated.

Insofar as the notch and the projecting part are offset transversely, passage from one to the other of the pre-hooking and open positions of the clamp fitting requires the transverse displacement of one end of the clamp fitting with respect to the other to align the notch and the projecting part.

This arrangement makes it possible to avoid untimely opening of the clamp fitting from its pre-hooking position.

Furthermore, even if the hook is poorly hooked behind the ear, it is capable, particularly under the effect of the elasticity of the clamp fitting, of automatically hooking between the ear and the projecting part by cooperation of this projecting part and the pre-hooking portion provided on the free edge of the hook.

In other words, even after partial loosening of the clamp fitting, the hook is at least hooked behind the projecting part.

According to a first embodiment of the invention, the projecting part is advantageously constituted by the curved end of the extension.

Applicants' Patent Application No. 93 06045 relates to a clamp fitting whose ear is provided with a stop which is integral therewith and which is capable of coming into contact with the inner face of the hook when the latter is being hooked on the ear, for the limit of elasticity not to be exceeded during tightening of the clamp fitting. According to this first embodiment, the outer face of the curved end of the extension advantageously acts as such a stop.

If requirements of tightness are associated with the use of the clamp fitting, the extension forms in known manner a sole which, when the clamp fitting is in the tightened state, extends at least beneath the hook. In that case, the projecting part is advantageously constituted by a portion cut out in the sole and folded with respect thereto.

BRIEF DESCRIPTION OF THE DRAWINGS

The invention will be more readily understood on reading the following description with reference to the accompanying drawings, in which:

FIG. 5 is a partial view in elevation of a clamp fitting according to the invention in a variant embodiment, this clamp fitting being shown in normal tightening position.

FIG. 6 shows in perspective a part of the clamp fitting of FIG. 5.

FIG. 7a is a view in the direction of arrow F of FIG. 5, showing the end of the clamp fitting provided with the hook.

FIG. 7b is a view in the direction G of FIG. 5, showing the end of the clamp fitting provided with the ear.

DESCRIPTION OF PREFERRED EMBODIMENT

Figure 1:
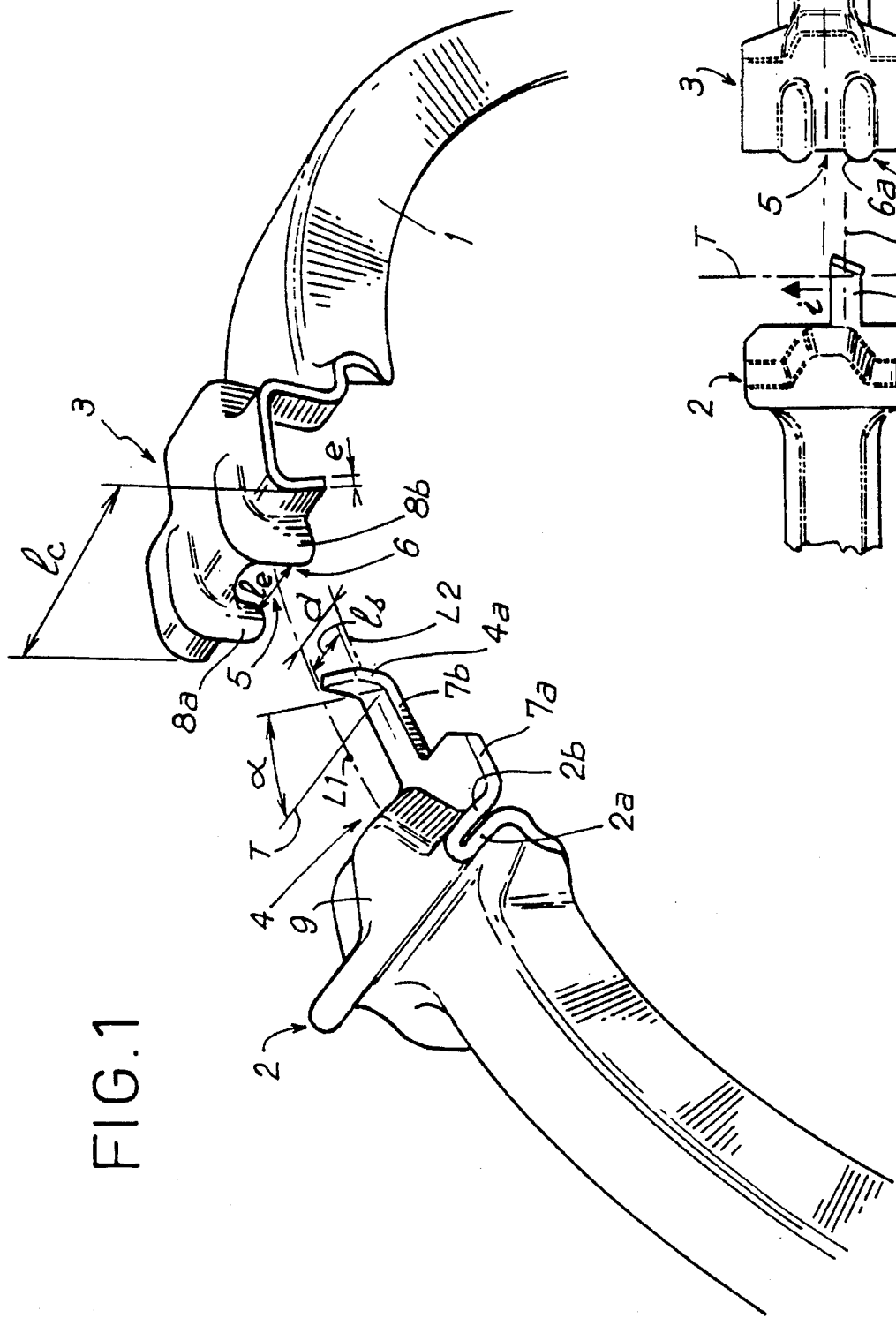
FIG. 1 is a partial view in perspective of a band clamp fitting according to the invention, shown in open position.

Referring now to the drawings, FIGS. 1 to 4 firstly show a band clamp fitting of the type mentioned above, constituted by a metal band 1 wound on itself. This band presents, near one of its ends, an ear 2 formed by two complementary radial folds 2a and 2b projecting radially on the outer periphery of the clamp fitting. As shown in the Figures, this ear 2 is preferably slightly inclined in the direction opposite tightening.

Figure 3:
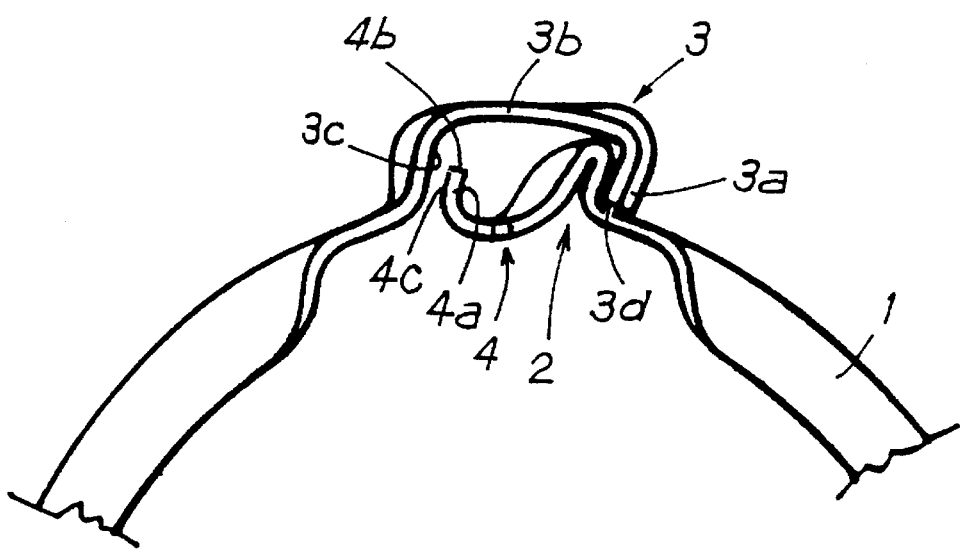
FIG. 3 is a partial view in elevation of the clamp fitting of FIG. 1 in normal tightening position, the hook being hooked behind the ear.

The other end of the metal band 1 is provided with a hook 3 which, as is seen in FIG. 3, is capable of being hooked behind the ear after the clamp fitting has been tightened.

The ear 2 is equipped with an extension 4 extending substantially along the periphery of the clamp fitting and of which a part 4a projects radially towards the outside of the clamp fitting.

The transverse dimension $1_S$ of this projecting part 4a is less than the transverse dimension $1_c$ of the free edge 3a of the hook 3.

This free edge 3a presents a notch 5 adapted for the passage of the projecting part 4a. The transverse dimension $1_e$ of the notch 5 is in fact at least equal to the transverse dimension $1_S$ of the projecting part 4a, while the radial heights of these two elements are of the same order.

The notch 5 and the projecting part 4a are offset with respect to one another in the transverse sense of the band.

In order to illustrate such offset in FIG. 1, the median line $L_1$ of the notch directed along the periphery of the clamp fitting and located, in the example shown, on the longitudinal axis of the latter, as well as the median line $L_2$ of the projecting part, are shown schematically in dashed and dotted broken lines. These two lines are spaced apart by distance d.

Figure 4:
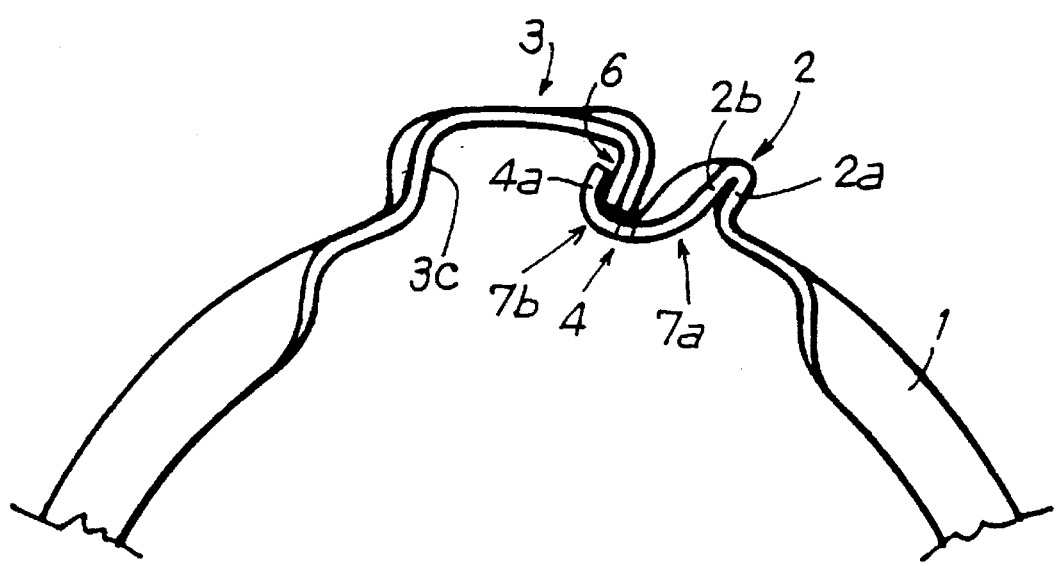
FIG. 4 is a view similar to FIG. 3, the hook being hooked behind the projecting part of the extension.

In pre-hooking position illustrated in FIG. 4, the projecting part 4a cooperates with a portion 6 of the free edge 3a of the hook 3.

Figure 2:
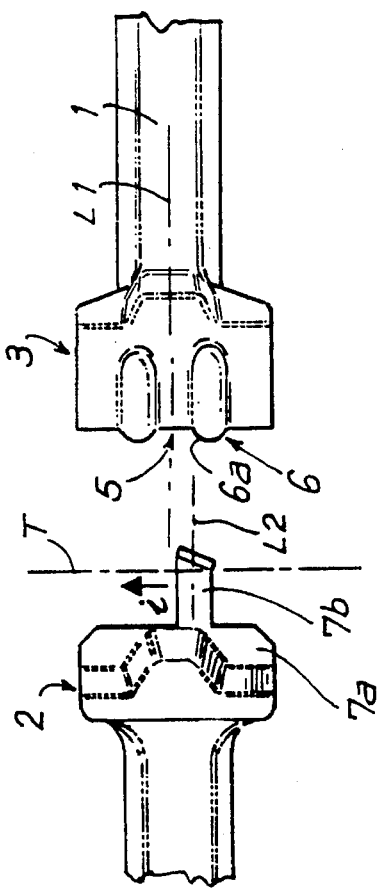
FIG. 2 is a partial plan view of the clamp fitting of FIG. 1.

As is more readily seen in FIG. 2, this pre-hooking portion 6 is located in line with the projecting part 4a, i.e. on line $L_2$.

The clamp fitting advantageously comprises means for aligning the transverse positions of the notch 5 and of the projecting part 4a, capable of being employed when the two ends of the band are brought together, from the open position illustrated in FIG. 1.

These means are visible in FIG. 2, which shows that the pre-hooking portion 6 is provided with a ramp 6a provided on the outer face of the free edge 3a of the hook.

This ramp 6a is inclined towards the inside of the hook with respect to an axis T transverse to the band 1 and extends in the vicinity of the notch 5.

In fact, in the example shown, the pre-hooking portion 6 is constituted by a portion of the free edge 3a of the hook, adjacent a radial edge of the notch 5.

In manner known per se, two swellings 8a and 8b are made on the hook on either side of the notch. These swellings are intended, when the hook hooks behind ear 2, to cooperate with a central swelling 9, adjacent the fold 2b of the ear, to guide the relative movement of this ear 2 and the hook 3.

The ramp 6a is then constituted by that of the faces of the swelling 8b which is adjacent the notch 5.

In order to increase the efficiency of this ramp 6a, the projecting part 4a makes an angle α with respect to axis T and therefore presents an inclination substantially parallel to the ramp.

Thanks to this design, when the two ends of the band are brought together, leading to the pre-hooking position, the ramp 6a and the projecting part 4a cooperate with one another. This results in a slight displacement of the projecting part with respect to the hook in the direction of arrow i, which causes lines $L_1$ and $L_2$ to merge, eliminating the offset d.

As soon as the projecting part 4a escapes from ramp 6, i.e as soon as it lies beneath the hook, the elasticity of the clamp fitting re-establishes the offset d, which allows portion 6a to hook behind projecting part 4a.

In order to open the clamp fitting from this prehooking position, it will suffice, by a simple manoeuvre, to displace the projecting part 4a and the hook 3 with respect to each other so that lines $L_1$ and $L_2$ merge again, for the projecting part to escape the pre-hooking portion 6a and to pass into notch 5.

As shown in the Figures, the free terminal edge 4b of this projecting part 4a is spaced apart from the ear 2, in the peripheral sense, by a distance at least equal to the thickness of the free edge 3a of the hook 3.

However, so as to allow hook 3 to hook on ear 2, this distance is less than the length of the central part 3b of the hook substantially parallel to the periphery of the clamp fitting. In this way, when the clamp fitting is tightened, the projecting part 4a is at the most located against the inner face 3c of the hook 3.

When the central swelling 9 is present, it is preferably the distance between the projecting part 4a and this swelling 9 which is at least equal to the thickness of the free edge 3a of the hook 3.

This configuration gives the band clamp fitting according to the invention double security, since, should the hooking of FIG. 3 be defective, the free edge 3a would, thanks to the inherent elasticity of the hook 3, be capable of being inserted between the ear 2 and the projecting part 4a to come into the pre-hooking position of FIG. 4.

In fact, if, further to a poor hooking, the free edge 3a of the hook 3 escaped the ear 2, it would be naturally retained by the projecting part 4a and, this latter being sufficiently spaced apart from the ear 2, the hook would hook thereon.

In order to allow pre-hooking, the radial height of the end 4b of the projecting part 4a must obviously be greater than the radial height of the end 3d of the free edge 3a of the hook 3.

In the drawings, the radial height of this end 4b is less than that of the ear 2; however, it may be substantially equal thereto.

In any case, the radial height of the end 4b is limited by the radial position of the inner face of the central part 3b of the hook 3.

FIGS. 1 and 4 show that the projecting part 4a is advantageously constituted by the curved end of the extension 4.

The outer face 4c of this curved end may act as stop and avoid any exceeding of the limit of elasticity of the clamp fitting during tightening.

On observing FIGS. 1 and 2, it is ascertained that the extension 4 of the clamp fitting shown therein comprises a first section 7a, adjacent the ear 2 and of transverse dimension substantially equal to that of the latter, and a second section 7b whose free end is provided with the projecting part 4a.

The transverse dimension of this second section 7b is substantially equal to the width 1 of the projecting part 4a and less than that of the first section 7a.

This arrangement facilitates passage of the projecting part in notch 5.

In fact, the first section 7a is provided with the swelling 9 and the length of the second section 7b is at least equal to the thickness e of the free edge of the hook.

In the example illustrated in FIGS. 1 to 4, the band clamp fitting presents in its running part a U-section adapted more particularly to the assembly of two tubes of which the ends are widened and may fit between the arms of the U of the clamp fitting section.

The embodiment described hereinabove is also applicable to a band clamp fitting of the type described in the European Patent mentioned above, formed by a flat band.

FIGS. 5, 6, 7a and 7b illustrate a variant embodiment of the invention, for band clamp fittings whose use is associated with requirements of tightness.

In these Figures, the elements already described and shown in FIGS. 1 and 2 are designated by the same references, increased by 10; it therefore appears unnecessary to describe them again.

As has been indicated hereinabove, the ear 12 is equipped with an extension 14 which extends substantially along the periphery of the clamp fitting. In order to ensure tightness, this extension 14 forms a sole which, when the clamp fitting is in tightened state, extends at least beneath hook 13. This means that the distance from the ear 12 to the free end of the sole 14 is at least equal to and advantageously slightly greater than the length of the central part 13b of the hook 13. This sole enables the clamp fitting to exert its tightening continuously over the whole periphery of the object to be tightened.

In this variant, the projecting part 14a is constituted by a portion cut out in the median part of the sole 14 and straightened up radially with respect thereto. Finally, part 14a may be slightly inclined in the direction opposite tightening, possibly more than the ear 12.

As shown in FIG. 6, insofar as the cut-out 14d for forming the projecting part 14a is made in the median part of the sole 14, the edges 14e of this cut-out ensure continuity of the contact of the sole on the object to be tightened and consequently make it possible not to interrupt the tightness of the clamp fitting.

In FIGS. 7a and 7b, which are aligned vertically, it is ascertained that this time it is the median line $L_{12}$ of the projecting part 14a which corresponds to the longitudinal axis of the band, while the median line $L_{11}$ of the notch 15 is offset transversely by a distance d'.

The pre-hooking portion 16 is constituted by that part of the free edge 13a of the hook 13 which lies on the median line $L_{12}$.

What is claimed is:

1. A band clamp fitting constituted by a metal band wound on itself, presenting near one of its ends a double radial fold, called "ear", projecting outwardly of the clamp fitting and equipped with an extension extending substantially along the periphery of the clamp fitting, the other end of said band being provided with a hook capable of being hooked behind the ear after the clamp fitting is tightened, the extension presenting a projecting part of which the transverse dimension is less than that of the free edge of the hook, said part projecting radially towards the outside of the clamp fitting and being capable of cooperating with pre-hooking means when the clamp fitting is in non-tightened state, wherein the free edge of the hook presents a notch whose transverse dimension and radial height are adapted to those of the projecting part, said notch and said projecting part are offset with respect to one another in the transverse sense of the band, the projecting part is spaced apart from the ear in the peripheral sense by a distance at least equal to the thickness of the free edge of the hook, and the pre-hooking means comprise a portion of the free edge of the hook, called "pre-hooking portion", capable of being hooked behind the projecting part, close to the notch and located in line with said projecting part.

2. The band clamp fitting of claim 1, wherein it comprises means for aligning the transverse positions of the notch and of the projecting part, capable of being employed when the two ends of the band are being brought together.

3. The band clamp fitting of claim 2, wherein the pre-hooking portion is provided with a ramp, inclined towards the inside of the hook with respect to an axis transverse to the band and extending at least in the vicinity of the notch, and the projecting part presents an inclination substantially parallel to that of said ramp.

4. The band clamp fitting of claim 1, wherein the projecting part is constituted by the curved end of the extension.

5. The band clamp fitting of claim 4, wherein the extension comprises a first section adjacent the ear, of transverse dimension substantially equal to that of said ear, and a second section whose free end is provided with the projecting part, the transverse dimensions of this second section and of the projecting part being substantially equal to one another and less than that of the first section.

6. The band clamp fitting of claim 1, wherein, the extension forming sole and extending, when the clamp fitting is in tightened state, at least beneath the hook, the projecting part is constituted by a portion cut out in said sole and radially straightened up with respect thereto.

* * * * *